(12) United States Patent
Hartman et al.

(10) Patent No.: US 6,345,611 B1
(45) Date of Patent: Feb. 12, 2002

(54) THERMOSTATICALLY CONTROLLED HEATER FOR GAS FUEL AND GAS PRESSURE REGULATOR

(75) Inventors: William Lyle Hartman, Waterloo; John Phillip Latusek, Cedar Falls; Rodney Allen Schindler, Hudson, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/569,206

(22) Filed: May 11, 2000

(51) Int. Cl.[7] .................................................. F02G 5/00
(52) U.S. Cl. ........................ 123/553; 123/527; 123/557; 123/3
(58) Field of Search ............................. 123/557, 3, 553, 123/527

(56) References Cited

U.S. PATENT DOCUMENTS

| | | | |
|---|---|---|---|
| 5,229,102 A | * 7/1993 | Minet et al. | 123/3 |
| 5,443,053 A | * 8/1995 | Johnson | 123/557 |
| 5,483,943 A | * 1/1996 | Peters | 123/557 |
| 5,558,069 A | * 9/1996 | Stay | 123/557 |
| 5,596,973 A | * 1/1997 | Grice | 123/557 |
| 5,778,861 A | * 7/1998 | Diduck | 123/557 |
| 5,806,502 A | * 9/1998 | Thomas et al. | 123/557 |
| 6,209,500 B1 | * 4/2001 | Tallio et al. | 123/557 |

* cited by examiner

Primary Examiner—Marguerite McMahon
Assistant Examiner—Jason Benton

(57) ABSTRACT

A heater for gas fuel mounted to a pressure reducing regulator to warm the gas after the temperature is reduced by the pressure reduction. The heater receives the fuel from the regulator through an external pipe and has separate gas and coolant passages therein. The coolant passage receives liquid engine coolant that heats both the gas and the regulator. A heater core has a plurality of radially extending fins around which the gas passes with the coolant passing through the interior of the core. Coolant flow is regulated by a thermostat that is responsive to the temperature of the gas to open and close the coolant passage.

18 Claims, 6 Drawing Sheets

THERMOSTATICALLY CONTROLLED HEATER FOR GAS FUEL AND GAS PRESSURE REGULATOR

BACKGROUND OF THE INVENTION

1. Field of the Invention

The present invention relates to a gas fuel heater and in particular to a heater mounted to a pressure regulator and having a thermostatic control that is responsive to the gas temperature to control the flow of engine coolant through the heater.

2. Description of Related Art

Compressed natural gas, when used as a vehicle fuel, is stored at very high pressures, typically greater than 3000 psi. The vehicle engine cannot utilize the fuel at this high pressure. Thus, a pressure reducing regulator is needed to lower the gas fuel pressure. A single stage regulator is more desirable than a multiple stage regulator due to the simplicity of the design. During the pressure reduction, as the gas expands, the temperature of the gas decreases. This expansion of gas can yield gas temperatures near or below –100° C. This cooling effect of the gas is most notable in the preferred single-stage regulator design. The single-stage regulator manufactured by ITT Conoflow is designed to expand the gas outside the body of the regulator so that the regulator itself is not subjected to the extreme cold of the expanding gas.

The gas fuel metering valve on the engine, however, must have gas at a temperature above 40° C. and preferably above 0° C. to avoid freezing of any moisture in the fuel line. When this pressure reducing regulator is used in close proximity to the engine, there is insufficient ambient heating of the gas in the fuel line connecting the regulator to the metering valve, on the engine to warm the fuel to the desire temperature. A heater is needed to raise the temperature of the expanded gas above the minimum temperature required by the fuel metering valve.

SUMMARY OF THE INVENTION

The present invention provides a natural gas heater that is thermostatically controlled. The heater housing is coupled to the body of the regulator. The heater is connected to the engine cooling system and receives engine coolant that flows through a coolant passage in the heater. The heater has a gas passage therein with a gas inlet and outlet. The heater gas inlet is in communication with the gas outlet of the regulator via an external pipe.

The heater housing is cylindrical and has a core therein that separates the gas and coolant passages. The core includes a cylindrical wall having radially outwardly extending fins in the gas passage and radially inward extending fins in the coolant passage. The outwardly extending fins are truncated at alternating axial ends, forming a serpentine gas passage around the fins. The cylindrical housing has a gas inlet and a gas outlet circumferentially spaced apart from one another. A pair of fins separate the gas inlet from the gas outlet, providing a insulating air space between the inlet and the outlet.

Engine coolant flows through the center of the core to provide heat to the core and the radially outward extending fins in the gas passage. A thermostat is provided to close the coolant passage when the gas is overheated. The thermostat is controlled by a wax reservoir located in the gas passage adjacent the gas outlet. The thermostat thus responds to the gas temperature to open and close the coolant passage.

Since the heater is attached externally to the regulator body as opposed to being integrally formed with the regulator body, if the regulator is used in a vehicle configuration where sufficient ambient heating of the gas fuel is available between the regulator and the engine, the heater can simply be eliminated and the fuel line to the engine coupled to the gas outlet of the regulator body.

In preferred embodiments, the gas fuel is regulated to 110 psi or 120 psi and is warmed to about 90° F. The heater of the present invention can be used with gaseous fuels other than natural gas that are stored at high pressures and are excessively cooled when the pressure is reduced in a single stage regulator.

DESCRIPTION OF THE PREFERRED EMBODIMENT

Figure 1:
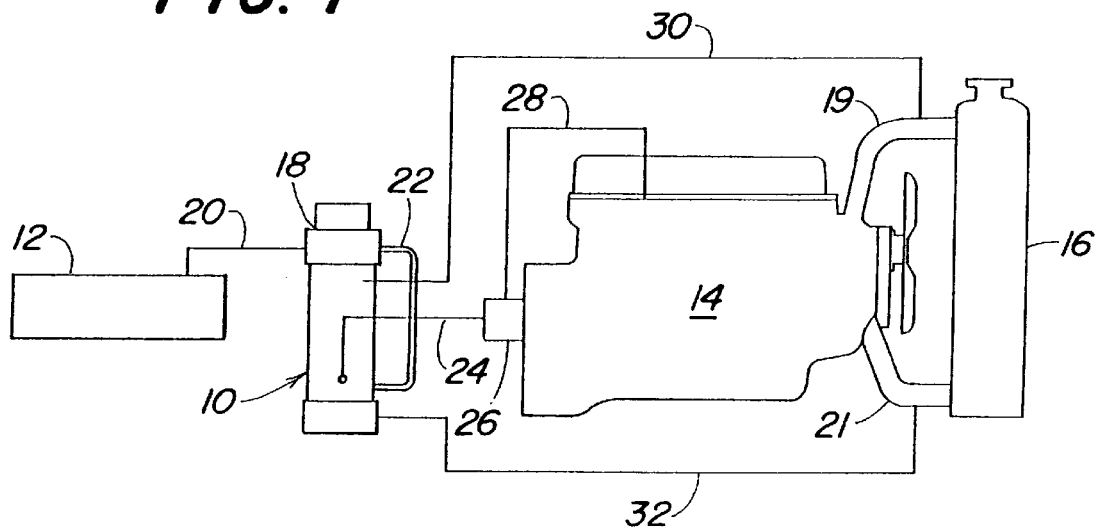
FIG. 1 is a schematic diagram of the natural gas fuel system.
Figure 2:
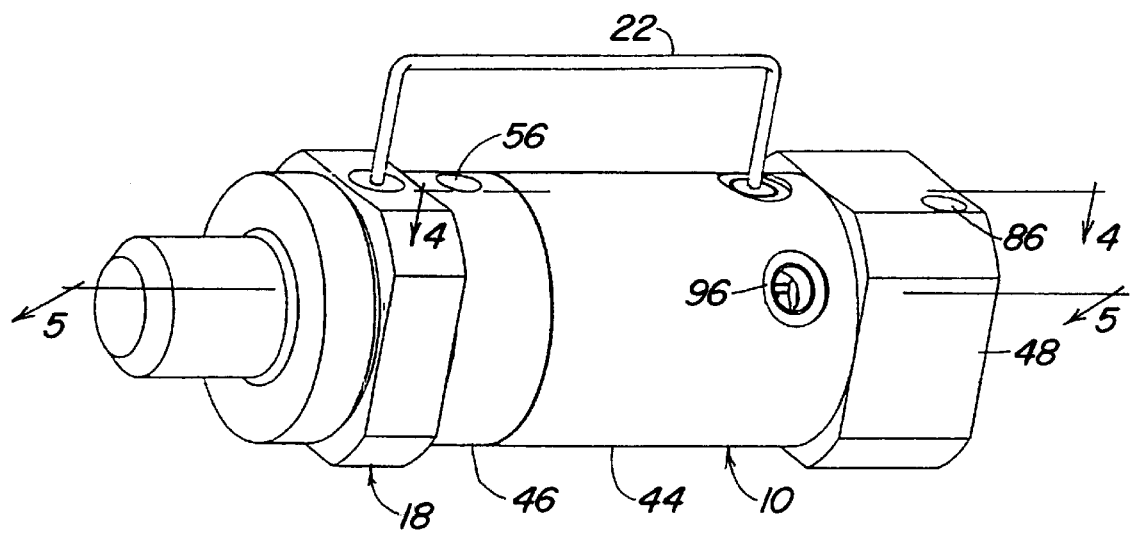
FIG. 2 is a perspective view of the regulator and gas heater of the present invention.
Figure 3:
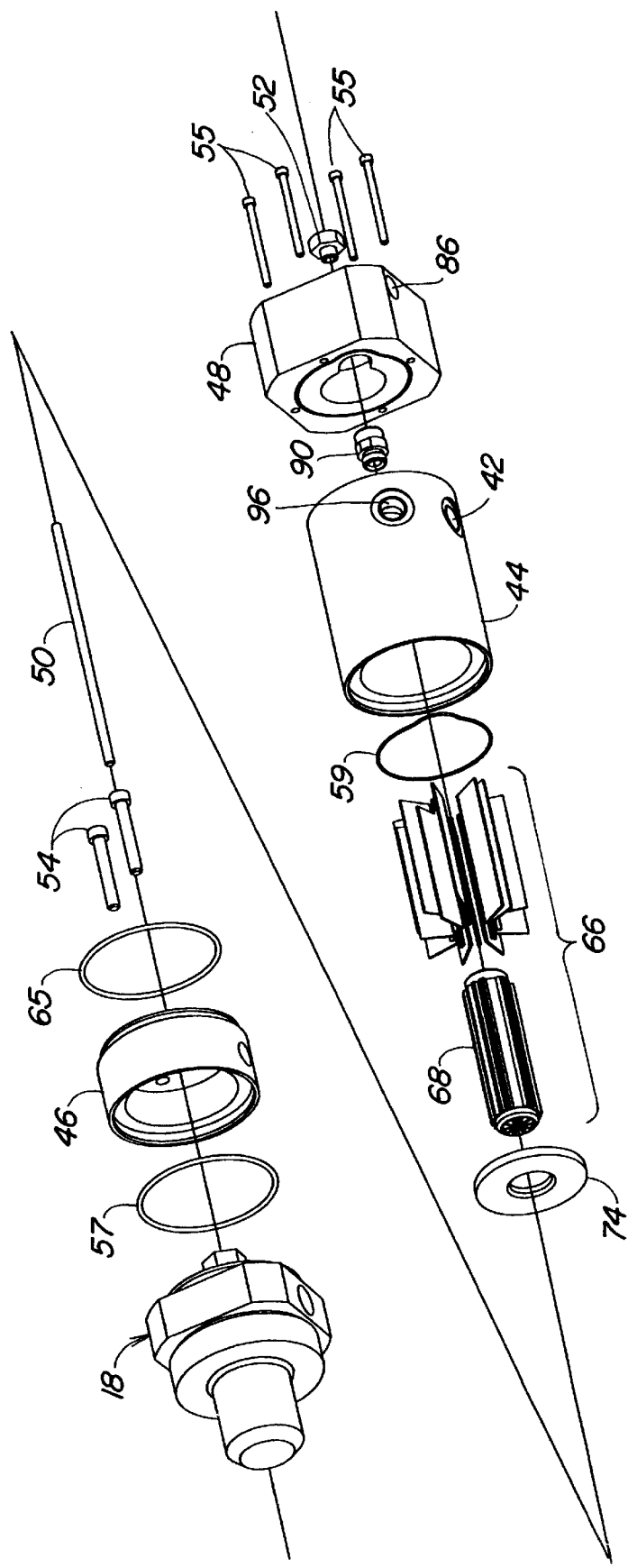
FIG. 3 is an exploded perspective view of the regulator and gas heater shown in FIG. 1.
Figure 4:
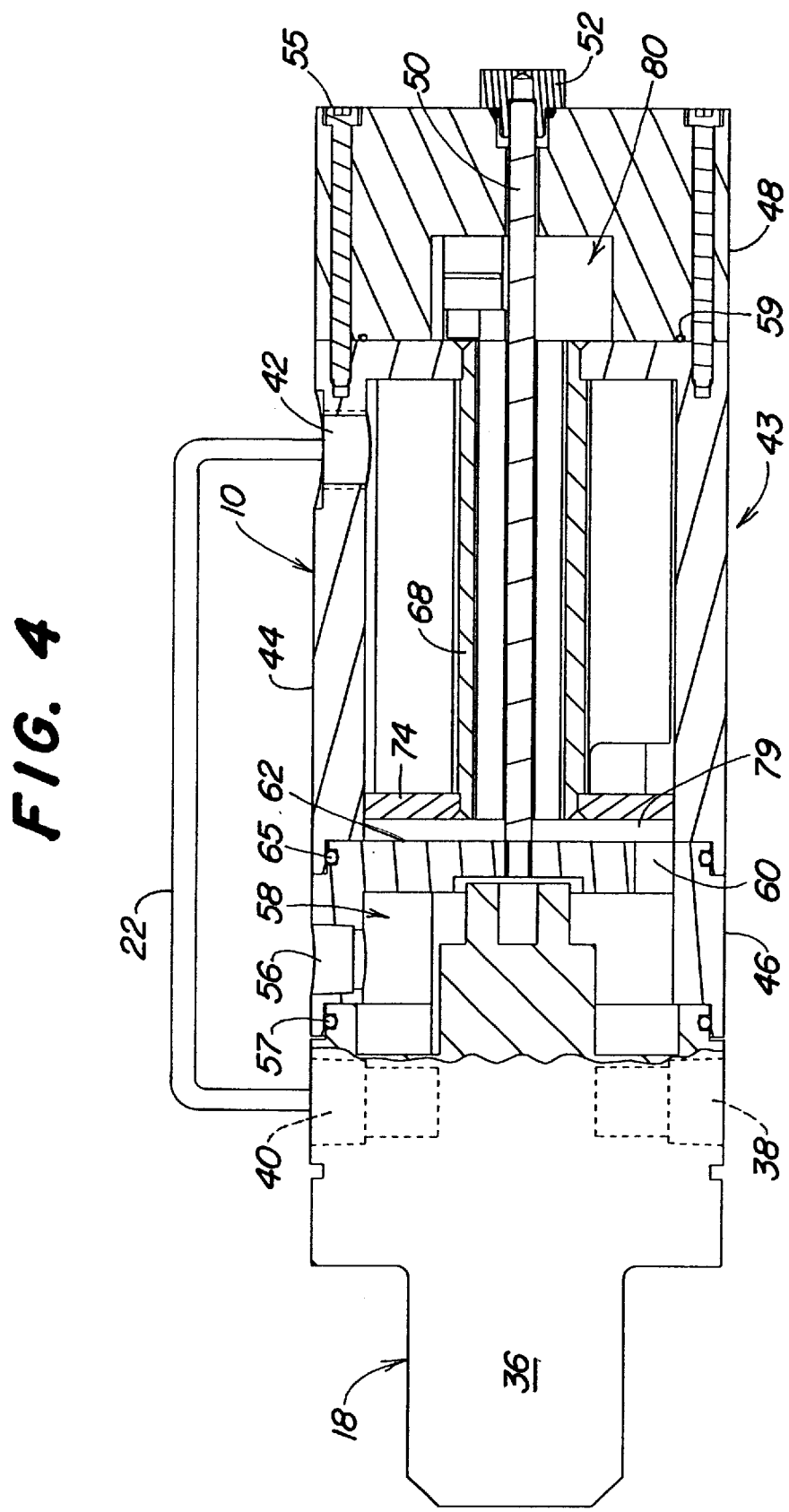
FIG. 4 is a sectional view as seen from the line 4—4 of FIG. 2.
Figure 5:
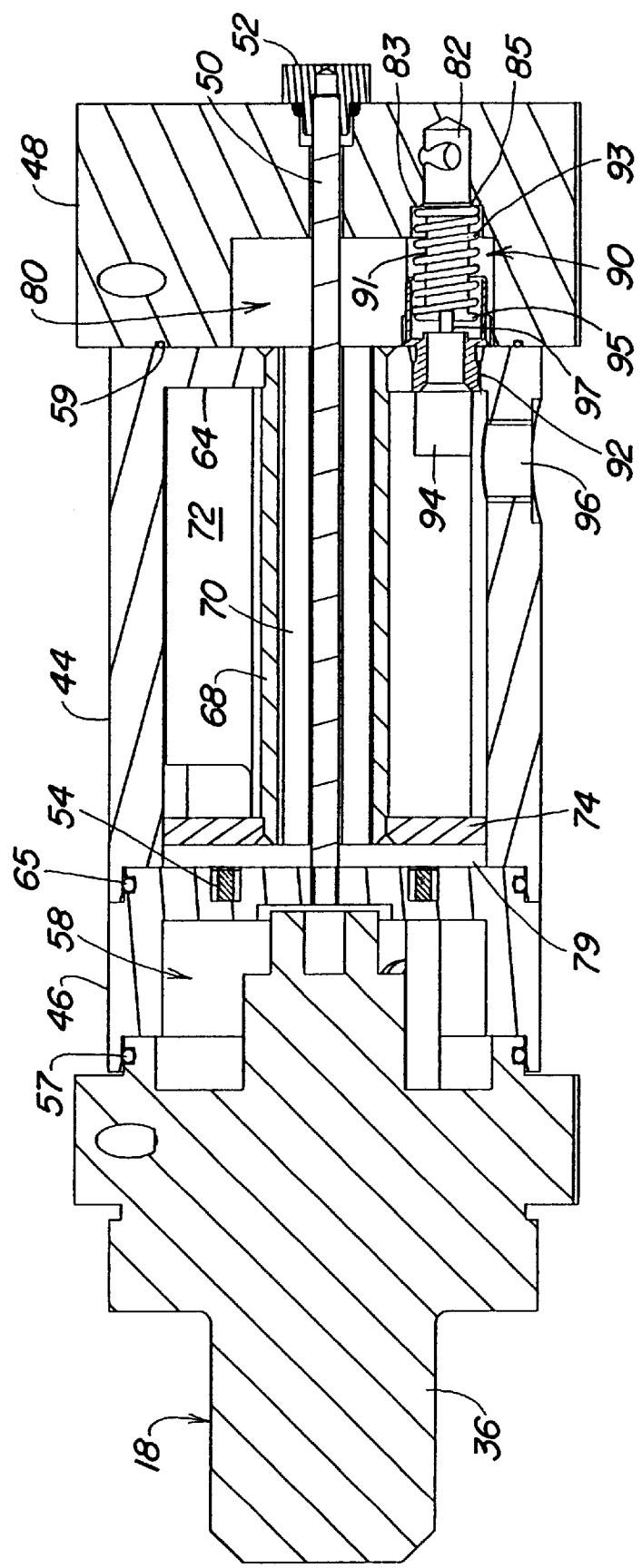
FIG. 5 is a sectional view as seen from the line 5—5 of FIG. 2.
Figure 7:
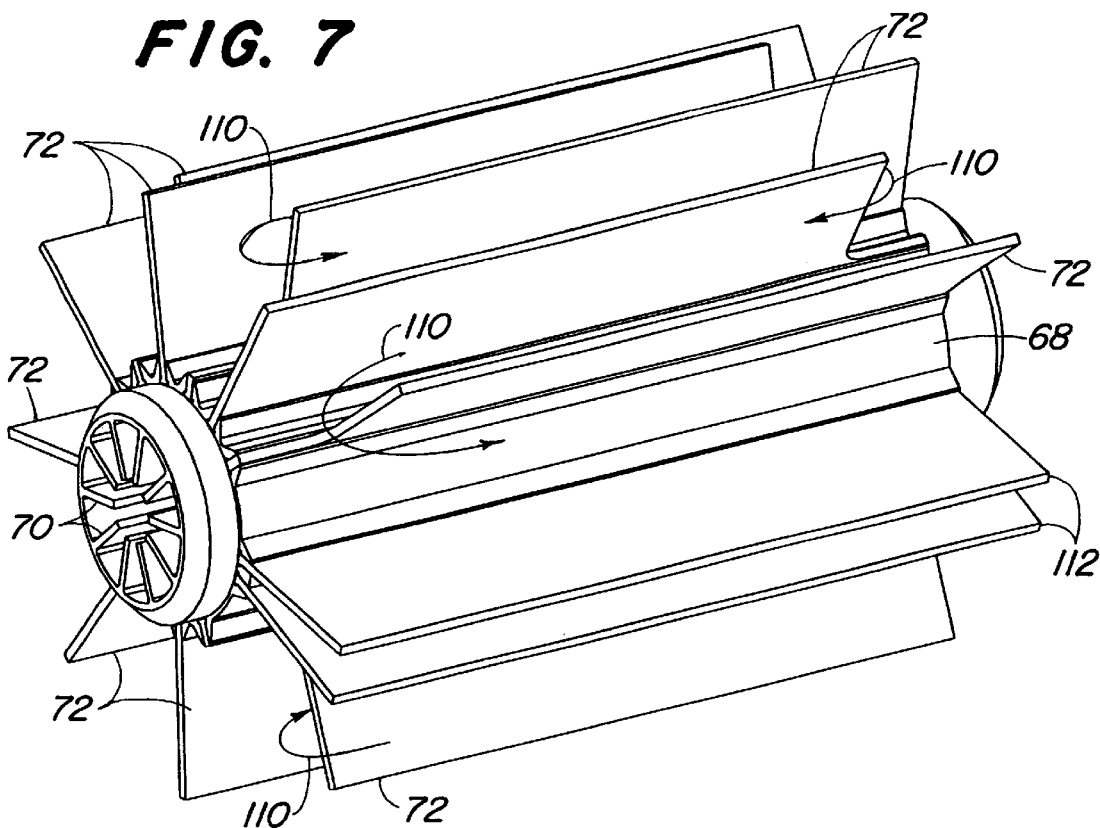
FIG. 7 is an enlarged perspective view of the heater core.
Figure 6:
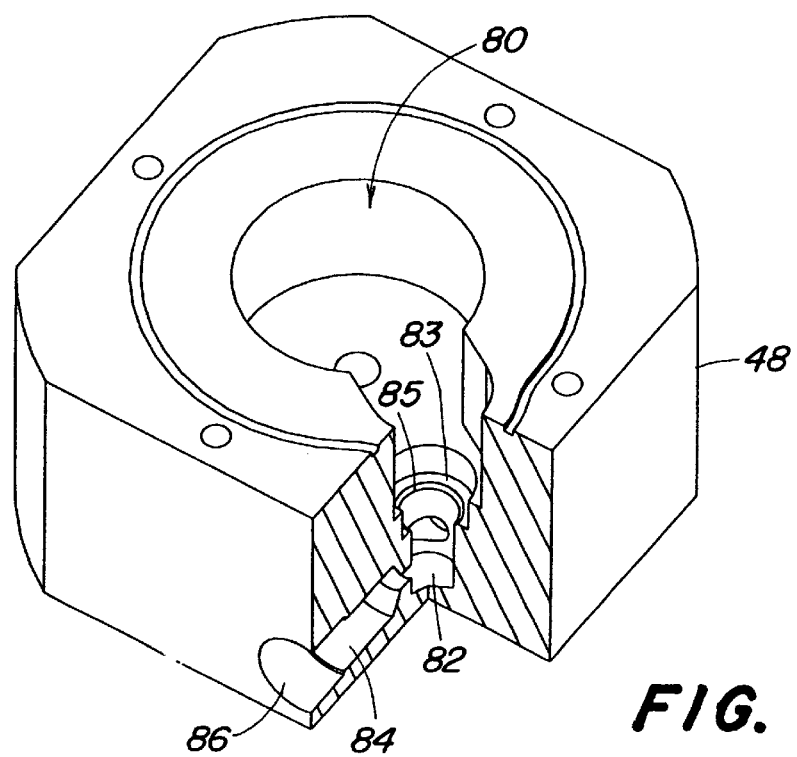
FIG. 6 is a cut-away perspective view of the heater housing end cap.
Figure 9:
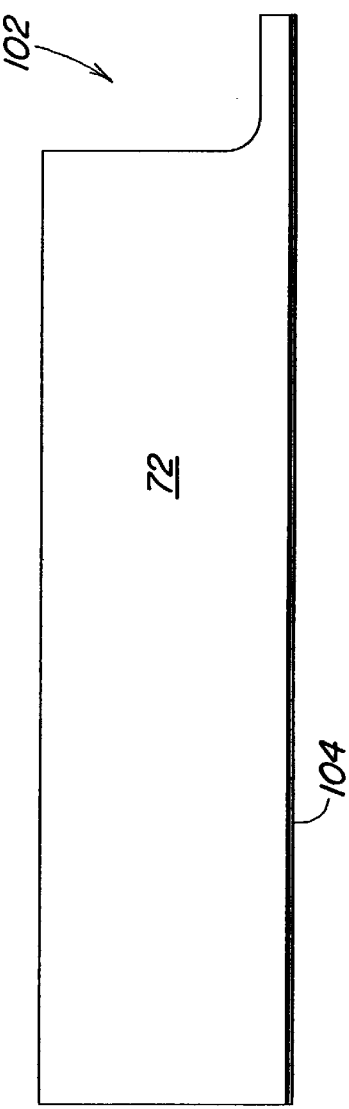
FIGS. 9 and 10 are side and end views of a fin of the heater core.

The heater 10 of the present invention is shown in FIG. 1 in a vehicle fuel system. The fuel system includes a fuel tank 12, a pressure regulator 18 and the heater 10 to supply gas fuel, such as natural gas to an engine 14. The engine 14 has a cooling system that includes a radiator 16 connected to the engine by hoses 19 and 21 in a conventional manner for a liquid cooled engine. The heater 10 is mounted to the body 36 of the pressure regulator 18. The regulator 18 receives high-pressure gas fuel from the tank 12 via a fuel line 20. The Regulator 18 reduces the pressure of the gas that exits the regulator 18. As a result of the drop in pressure of the gas, the gas temperature is reduced. The cooled gas travels through an external pipe 22 from the regulator outlet to the gas inlet of the heater 10. After being heated in the heater 10, the gas travels through the fuel line 24 to a metering valve 26 on the engine 14. A fuel line 28 directs the fuel from the valve 26 to the engine. Coolant from the engine cooling system is provided to the heater through a coolant line 30 and is returned to the engine cooling system through a coolant line 32.

With reference to FIGS. 2–5, the heater 10 is shown in greater detail. The heater 10 is shown attached to the regulator 18. The regulator 18 includes a body 36 having a gas inlet 38 and a gas outlet 40. The regulator is preferably a regulator from ITT Conoflow from its High Pressure Natural Gas Vehicle series of regulators and is designed to expand the gas primarily outside the body of the regulator, beyond the outlet 40. As a result, the regulator is not subjected to the extreme cold of the expanding gas. The external pipe 22 directs the cold, low-pressure gas from the outlet 40 to the gas inlet 42 of the heater 10.

The heater 10 includes a housing 43 with three main sections, a cylindrical portion 44, an extension 46 and an end cap 48. The cylindrical portion, the extension and the end cap 44 are held together by a threaded stud 50 that is threaded into the housing extension 46 and extends through the housing cylindrical portion 44 and end cap 48. A nut 52 at the end of the heater retains the stud 50. A pair of bolts 54 secures the housing extension to the regulator body 36. An O-ring 57 provides a seal between the housing extension and the regulator body 36. Bolts 55 couple the end cap 48 to the cylindrical portion 44 with an O-ring seal 59 therebetween.

The coolant inlet 56 to the heater is provided in the extension 46. The housing extension is cup shaped having a radial end wall 62 and forms a hollow chamber 58. The chamber 58 is open to the end of the heater that faces the regulator 18. When the heater is attached to the regulator, the regulator body 36 closes the chamber 58. The coolant inlet 56 admits the liquid coolant into the chamber 58, whereby the coolant engages the regulator body 36 to heat the regulator. The housing extension has an aperture 60 through the radial end wall 62 to allow coolant flow from the chamber 58. The aperture 60 is positioned opposite from the coolant inlet 56 such that coolant entering the chamber 58 must flow across the regulator body to the aperture 60.

The cylindrical portion 44 has a bottom wall 64 at one end and is open at the opposite end that is sealed against the extension with an O-ring seal 65. A core 66 is placed within the cylindrical portion 44. The core has a tubular or cylindrical wall 68 with a plurality inwardly extending fins 70 and outwardly extending fins 72. The stud 50 extends through the core inside the tubular wall 68. An end cover 74, similar to a washer, is placed at the open end of the cylindrical portion and seats on the ends of the outer fins 72. The cover 74 extends radially between the tubular wall 68 of the core and the inside surface of the housing cylindrical portion 44. The tubular wall 68 of the core 66 divides the interior of the housing cylindrical portion 44 into separated gas and coolant passages. The gas passage is radially outside of the tubular wall 68 while the coolant passage 78 is inside the tubular wall 68. The cover 74 is spaced from the end wall 62 of the extension to provide a gap 79 for coolant flow from the aperture 60 to the center of the core where the coolant flows through the tubular wall, over the surface of the inner fins 70. The coolant heats the tubular wall 68 and the outer fins 72.

The coolant flows to the well 80 formed in the end cap 48. From the well 80, coolant flows through sump 82 to a cross bore 84 leading to the coolant outlet 86. The sump 82 forms a ledge 83 and a seat 85 for a thermostat 90. The thermostat 90 has a fitting 92 that is threaded in the bottom wall 64 of the housing cylindrical portion 44. The thermostat 90 includes a plunger 91 that engages the seat 85 to close the sump 82, stopping the flow of coolant through the heater. The plunger 91 is biased away from the seat 85 by a spring 93 that engages the ledge 83 and the lip 95 of the plunger. A rod 97 is connected to the plunger 91 and extends into a wax reservoir 94. The wax reservoir is disposed in the gas passage adjacent the gas outlet 96. If the gas fuel temperature rises too high, the wax melts and increases in volume, causing the rod and plunger to move against the spring until the plunger engages the seat 85 to stop the flow of coolant. When the gas temperature later drops, the wax solidifies and contracts, allowing the plunger to move away from the seat by the spring force and allow coolant flow to resume. The thermostat wax reservoir 94 is disposed in the housing cylindrical portion 44 in the gas passage adjacent to the heater gas outlet 96 so that the thermostat is responsive to the gas temperature, not the coolant temperature, in regulating the flow of coolant through the heater. As a result, the gas is maintained at a constant or near constant temperature while the regulator body temperature will vary somewhat depending on the flow of the coolant through the housing extension 46 necessary to maintain the desired gas temperature.

Figure 10:
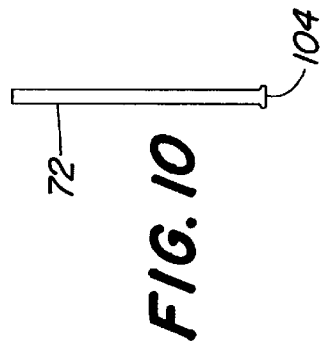

The core 66 is shown in greater detail with reference to FIGS. 7–10. The core includes an extrusion forming the tubular wall 68 and the inwardly directed fins 70. The exterior of the wall 68 is formed with a plurality of circumferentially spaced T-shaped slots 98. The slots 98 receive individual fins 72. The fins have an enlarged edge 104 that is T-shaped in cross section as shown in FIG. 10. The fins are truncated at one end by a cutout portion 102. The fins are mounted to the wall 68 by sliding the T-shaped edge 104 lengthwise in the slots 98. The fins 70 are arranged with the cutout portion 102 at alternating ends of the core 66, forming a serpentine path for the gas flow over the surface of the fins 70 as shown by the arrows 110 in FIG. 7.

Figure 8:
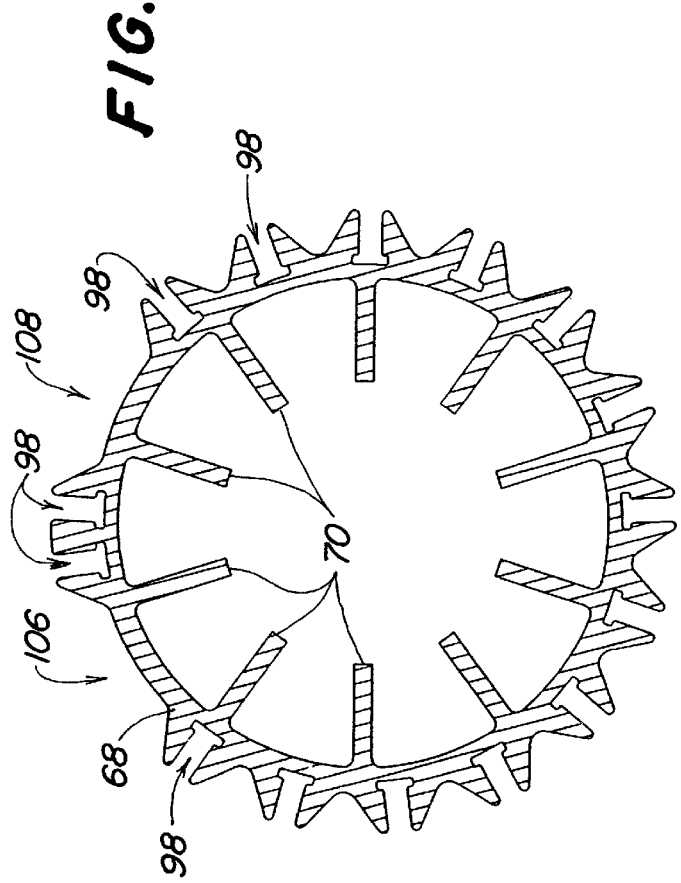
FIG. 8 is a sectional view of the heater core with the fins removed.

With specific reference to FIG. 8, the core wall 68 is shown with a larger space 106 adjacent the T-slots and another larger space 108 between adjacent T-slots. Two closely spaced T-slots 98 separate the spaces 106 and 108. The space 106 is provided adjacent to the gas flow outlet 96 in the housing cylindrical portion 44 while the space 108 is positioned adjacent the gas inlet 42. The two slots 98 between the spaces 106, 108 are provided for two full length fins 112 that are like the fins 72 without the cutout portions 102. The fins 112 provide an air space therebetween creating an insulating layer between gas inlet 42 and gas outlet 96 so that the inlet gas does not cool the outlet gas.

The external connection between the regulator outlet and the heater gas inlet by the pipe 22 enables the regulator to be easily used without the heater 10 if the application provides sufficient fuel line length between the regulator and the engine metering valve for ambient heating of the fuel. The heater is not mounted to the regulator, and the fuel line 24 to the engine is connected directly to the regulator outlet 40.

While it is preferred to mount the heater to the regulator such that the regulator is also warmed by the coolant, the heater can be used as a stand alone heater. In this case, there would not be an open chamber 58 for the coolant to heat the regulator. Rather, the coolant would flow through an inlet into the core area of the heater for flow through the inside of the tubular wall 68 to heat the core 66. The heater still has the advantage of regulating coolant flow as a function of the gas temperature, not the coolant temperature. The invention should not be limited to the above-described embodiment, but should be limited solely by the claims that follow.

We claim:

1. A heater for gas fuel mounted to a gas fuel pressure regulator, the regulator having a regulator body with a high pressure gas inlet and a low pressure gas outlet, the heater comprising:

a heater housing coupled to the regulator body, the heater housing having a gas inlet in communication with the regulator outlet and a gas outlet, the heater housing further having a coolant inlet and a coolant outlet and a coolant passage therebetween which is partially defined by the regulator body wherein coolant in the coolant passage engages the regulator housing;

a core within the heater housing defining a gas passage and separating the gas passage from the coolant passage therein; and a coolant flow control member at least partially disposed in the gas passage adjacent the gas outlet to be responsive to gas temperature in the gas passage for opening and closing the coolant passage to enable or prevent coolant flow through the coolant passage as a function of gas temperature.

2. The heater as defined by claim 1 further comprising a gas flow pipe from the regulator gas outlet to the heater housing gas inlet external to the regulator body and the heater housing.

3. The heater as defined by claim 1 wherein the heater housing has a cylindrical portion with the core disposed therein radially separating the gas and coolant passages.

4. The heater as defined by claim 3 wherein the housing has an extension at one end of the cylindrical portion engaging the regulator body and having the coolant inlet therein with the coolant passage in the extension being defined in part by the regulator body.

5. The heater as defined by claim 4 wherein the coolant flows laterally across the regulator body within the extension from the coolant inlet afterwhich coolant flows axially into the cylindrical portion of the heater housing.

6. The heater as defined by claim 3 wherein the core has a cylindrical wall spaced inward from the cylindrical portion of the heater housing that radially separates the gas and coolant passages.

7. The heater as defined by claim 6 further comprising fins extending radially outward from the cylindrical core wall to the cylindrical portion of the housing and defining the gas passage, the fins being axially truncated at alternating axial ends to define a serpentine gas passage around the fins with the coolant passage within the core cylindrical wall.

8. The heater as defined by claim 7 wherein the heater housing gas inlet and outlet are circumferentially spaced from one another in the cylindrical portion of the heater housing.

9. The heater as defined by claim 8 wherein two fins of the core are disposed between the heater housing gas inlet and gas outlet.

10. The heater as defined by claim 1 wherein the coolant inlet is adjacent the regulator body and the coolant outlet is adjacent the heater gas outlet.

11. The heater as defined by claim 1 wherein the coolant flow control member includes a wax reservoir disposed in the gas passage and is thereby responsive to the gas temperature.

12. A heater for gas fuel comprising:

a heater housing having a gas inlet in communication with a gas source and the housing having a gas outlet, the heater housing further having a coolant inlet and a coolant outlet and a coolant passage therebetween which is partially defined by the regulator body wherein coolant in the coolant passage engages the regulator housing;

a core within the heater housing defining a gas passage and separating the gas passage from the coolant passage therein; and a coolant flow control member at least partially disposed in the gas passage adjacent the gas outlet to be responsive to gas temperature in the gas passage for opening and closing the coolant passage to enable or prevent coolant flow through the coolant passage as a function of gas temperature.

13. The heater as defined by claim 12 wherein the heater housing has a cylindrical portion with the core disposed therein radially separating the gas and coolant passages.

14. The heater as defined by claim 13 wherein the core has a cylindrical wall spaced inward from the cylindrical portion of the heater housing that radially separates the gas and coolant passages.

15. The heater as defined by claim 14 further comprising fins extending radially outward from the cylindrical core wall to the cylindrical portion of the housing and defining the gas passage, the fins being axially truncated at alternating axial ends to define a serpentine gas passage around the fins with the coolant passage within the core cylindrical wall.

16. The heater as defined by claim 15 wherein the heater housing gas inlet and outlet are circumferentially spaced from one another in the cylindrical portion of the heater housing.

17. The heater as defined by claim 16 wherein two fins of the core are disposed between the heater housing gas inlet and gas outlet.

18. The heater as defined by claim 12 wherein the coolant flow control member includes a wax reservoir disposed in the gas passage and is thereby responsive to the gas temperature.

* * * * *